(12) United States Patent
Miura

(10) Patent No.: US 10,139,127 B2
(45) Date of Patent: Nov. 27, 2018

(54) COMBUSTION APPARATUS

(71) Applicant: Rinnai Corporation, Nagoya-shi, Aichi (JP)

(72) Inventor: Takuya Miura, Nagoya (JP)

(73) Assignee: Rinnai Corporation, Nagoya-shi (JP)

(*) Notice: Subject to any disclaimer, the term of this patent is extended or adjusted under 35 U.S.C. 154(b) by 0 days.

(21) Appl. No.: 15/489,801

(22) Filed: Apr. 18, 2017

(65) Prior Publication Data
US 2017/0328597 A1  Nov. 16, 2017

(30) Foreign Application Priority Data
May 12, 2016 (JP) .................................. 2016-95805

(51) Int. Cl.
*F24H 1/14* (2006.01)
*F24H 8/00* (2006.01)
*F24H 9/18* (2006.01)

(52) U.S. Cl.
CPC ............. *F24H 1/145* (2013.01); *F24H 8/006* (2013.01); *F24H 9/1881* (2013.01); *Y02B 30/106* (2013.01)

(58) Field of Classification Search
CPC ........ F24H 8/00; F24H 2210/00; F24H 1/145; F04B 53/04; F28D 2021/0024
See application file for complete search history.

(56) References Cited

U.S. PATENT DOCUMENTS

| | | | | |
|---|---|---|---|---|
| 6,971,335 | B2* | 12/2005 | Kobayashi | .............. F24H 8/006 122/122 |
| 7,360,535 | B2* | 4/2008 | Kobayashi | .............. F24H 8/006 122/13.01 |
| 8,844,471 | B2* | 9/2014 | Glanville | ................ F24H 1/206 122/17.1 |
| 9,513,003 | B2* | 12/2016 | Watanabe | ............... F23L 11/02 |
| 2016/0273850 | A1* | 9/2016 | Okamoto | .............. F28F 21/083 |
| 2017/0167754 | A1* | 6/2017 | Lesage | ................. F24H 9/0015 |

FOREIGN PATENT DOCUMENTS

JP    04-113167    4/1992

* cited by examiner

*Primary Examiner* — Gregory A Wilson
(74) *Attorney, Agent, or Firm* — Amin, Turocy & Watson LLP

(57) ABSTRACT

A combustion apparatus includes a burner (11), a heat exchanger (12) accommodated in a casing (20), an exhaust passage (22B) provided to one side surface side of the casing (20), and an exhaust resistance member (5) having a plurality of ventilation ports (50) through which combustion exhaust gas passes, wherein at least one part of the ventilation ports (50) has an elongated hole shape extending in the flow direction of the combustion exhaust gas from beneath the casing (20) to the exhaust passage (22B).

5 Claims, 7 Drawing Sheets

COMBUSTION APPARATUS

CROSS REFERENCE TO RELATED APPLICATIONS

The present application claims a priority based on a Japanese Patent Application No. 2016-95805 filed on May 12, 2016, the content of which is hereby incorporated by reference in its entirely.

FIELD OF THE INVENTION

The present invention relates to a combustion apparatus. Especially, the present invention relates to a combustion apparatus configured to flow combustion exhaust gas generated by a burner through a heat exchanger from top to bottom.

BACKGROUND ART

According to a conventional combustion apparatus such as a conventional water heater or a conventional heat source device for a room heater, when airflow resistance in a circulation path of combustion exhaust gas ejected from a burner is too low, pressure around a combustion area of the burner largely fluctuates in an intensive combustion mode of the burner. As a result, combustion balance is disturbed, vibration combustion occurs, and noise increases. Accordingly, it has been proposed to provide, on a downstream side end of a casing that forms the circulation path of the combustion exhaust gas, an exhaust resistance plate having a plurality of small circular ventilation ports, so as to regulate an exhaust flow rate of the combustion exhaust gas discharged from the casing. (For example, Japanese Unexamined Patent Publication No. H04-113167 A)

On the other hand, there has been also known a so-called downward combustion type combustion apparatus configured to flow combustion exhaust gas through a heat exchanger from top to bottom. In this kind of the combustion apparatus, when the exhaust resistance plate is provided beneath the heat exchanger, i.e., on a downstream side in the casing, drain, which is generated on a surface of the heat exchanger during a combustion operation, drips onto the exhaust resistance plate and forms a film of water on the ventilation ports, whereby the ventilation ports may be closed.

In particular, as the above-described conventional combustion apparatus uses the exhaust resistance plate having the small circular ventilation ports, the drain is likely to be retained at circumferential edges of the circular ventilation ports due to surface tension. Therefore, even a minute amount of drain may close the ventilation ports. When the ventilation ports are closed by the film of water, the exhaust flow rate from the casing reduces, and accordingly input to the burner (a supply amount of the fuel gas on a heat value basis) reduces. As a result, the heat exchanger hardly recovers an necessary amount of heat, and a heat medium at a desired temperature may not be supplied to a hot-water supplying terminal.

SUMMARY OF THE INVENTION

The present invention has been made in view of the foregoing problem, and an object of the present invention is to reduce combustion noise and improve stability of a hot water supply performance of a combustion apparatus such as a water heater or a heat source device for a room heater.

According to the present invention, there is provided a combustion apparatus comprising:

a burner for combusting fuel gas to generate combustion exhaust gas;

a heat exchanger for recovering heat in the combustion exhaust gas to heat a heat medium, the heat exchanger being accommodated in a casing having a substantially quadrangular box shape;

an exhaust passage for discharging the combustion exhaust gas from an exhaust port, the exhaust passage being provided to one side surface side of the casing; and an exhaust resistance member having a plurality of ventilation ports through which the combustion exhaust gas passes and being provided beneath the heat exchanger, wherein the burner, the heat exchanger, and the exhaust passage are arranged in such a manner that the combustion exhaust gas flows from top to bottom through the heat exchanger in the casing, and further from beneath the casing to the exhaust port via the exhaust passage provided at the one side surface side of the casing, and at least one part of the ventilation ports of the exhaust resistance member has an elongated hole shape extending in the flow direction of the combustion exhaust gas from beneath the casing to the exhaust passage.

According to the present invention, as a reduction in input of the burner due to closing of the ventilation ports by drain can be prevented, a stable hot water supply performance can be obtained. Further, as the exhaust resistance member properly regulates an exhaust flow rate, vibration combustion hardly occurs. Accordingly, vibration noise can be reduced.

Other objects, features and advantages of the present invention will become more fully understood from the detailed description given hereinbelow and the accompanying drawings which are given by way of illustration only, and thus are not to be considered as limiting the present invention.

PREFERRED MODE FOR CARRYING OUT THE INVENTION

Hereinafter, referring to drawings, an embodiment of the present invention will be described in detail.

Figure 1:
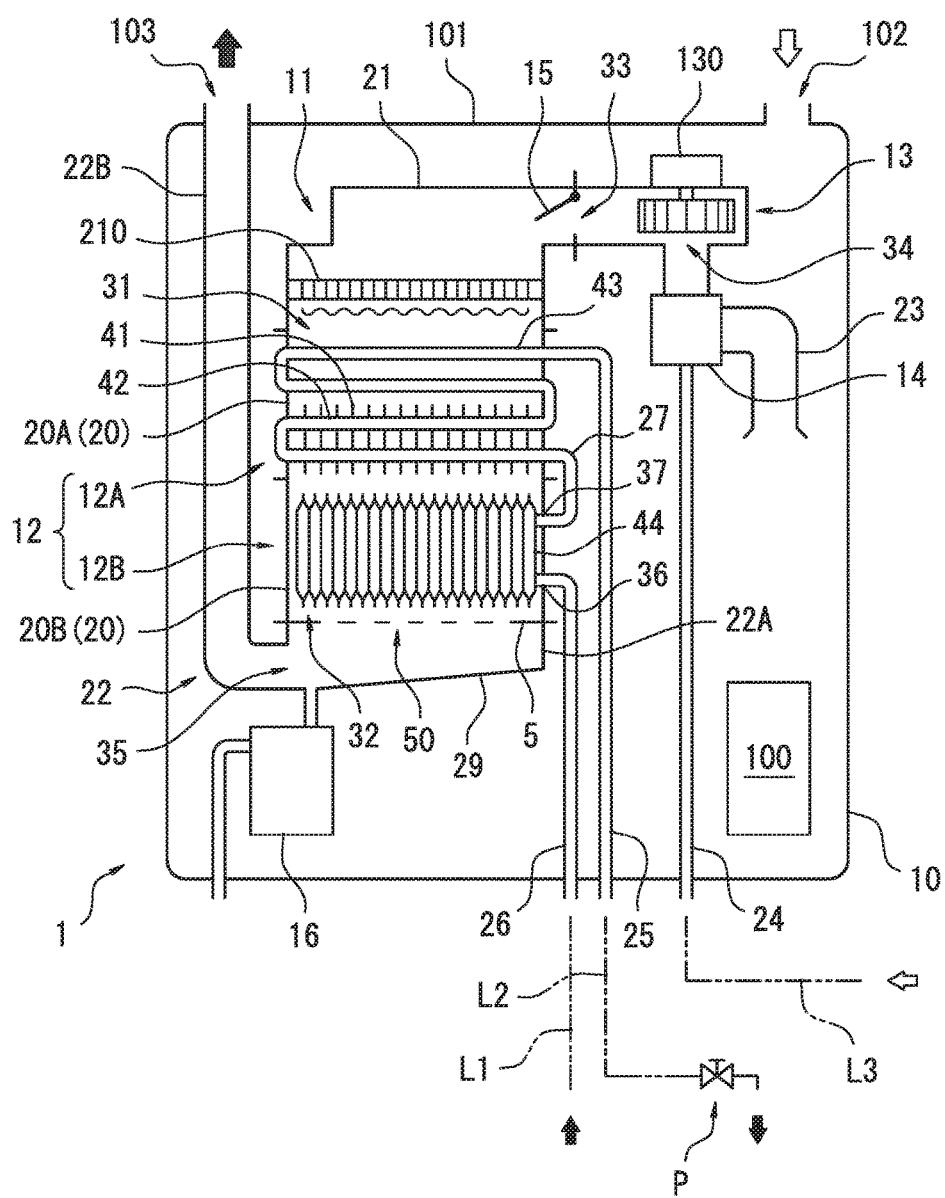
FIG. 1 is a schematic diagram showing one example of a combustion apparatus according to an embodiment of the present invention.

As shown in FIG. 1, a combustion apparatus 1 according to an embodiment of the present invention is a water heater that heats water (a heat medium) supplied into a heat exchanger 12 from a water supply pipe L1 with combustion exhaust gas generated by a burner 11, and supplies hot water to a hot-water supplying terminal P such as a faucet or a shower through a hot-water supply pipe L2.

Inside an outer casing 10 of the combustion apparatus 1, a substantially quadrangular box shaped casing 20 forming an exterior of the heat exchanger 12 is accommodated. Accordingly, the casing 20 forms part of a circulation path of the combustion exhaust gas. At an upper wall 101 of the outer casing 10, an air supply port 102 for taking air outside the combustion apparatus 1 into the outer casing 10, and an exhaust port 103 for discharging the combustion exhaust gas introduced into the casing 20 to outside the combustion apparatus 1 are provided.

Although not shown, the outer casing 10 includes a substantially rectangular box shaped casing main body whose front surface is open, and a front panel closing a front opening of the casing main body. A front surface of the front panel constitutes a front of the combustion apparatus 1. Accordingly, in this specification, when the outer casing 10 is viewed from the front surface side of the front panel, a depth direction, a width direction, and a height direction of the combustion apparatus 1 respectively correspond to a front-and-back direction, a left-and-right direction, and an up-and-down direction.

An upper end 31 of the casing 20 is continuously connected to a substantially quadrangular box shaped burner body 21 forming an exterior of the burner 11. The burner body 21 opens downward. On the other hand, a lower end 32 of the casing 20 is continuously connected to an exhaust duct 22 for guiding the combustion exhaust gas, which has been introduced from the burner 11 into the casing 20, to the exhaust port 103.

A gas introduction port 33 of the burner 11 is connected to a combustion fan 13 for sending a mixture gas of fuel gas and air into the burner body 21. Further, a suction port 34 of the combustion fan 13 is continuously connected to a premixing device 14 for mixing the air introduced from outside the combustion apparatus 1 into the outer casing 10 with the fuel gas introduced from a gas supply pipe L3. Furthermore, the premixing device 14 is connected to an air supply pipe 23 having one end opened in the outer casing 10 and guiding the air inside the outer casing 10 to the premixing device 14, and a gas introduction pipe 24 guiding the fuel gas introduced from the gas supply pipe L3 to the premixing device 14. The mixture gas of the fuel gas introduced from the gas introduction pipe 24 and the air inside the outer casing 10 is supplied into the burner body 21 by adjusting an opening degree of a not-shown mixing valve installed in the premixing device 14 and actuating the combustion fan 13.

At the gas introduction port 33 of the burner 11, a check valve 15 is provided. The check valve 15 stops that the mixture gas supplied into the burner body 21 or strong acid vapor generating on a surface of the heat exchanger 12 flows back into a fan casing of the combustion fan 13, the premixing device 14, and the outer casing 10.

The exhaust duct 22 includes a bottom cover 22A for covering the lower end 32 of the casing 20 from below, and a cylinder body (exhaust passage) 22B extending rearward from an exhaust discharge port 35 provided on a rear side of the bottom cover 22A, and further extending upward along a rear surface of the casing 20. An upper end of the cylinder body 22B is connected to the exhaust port 103.

As described above, an air supply-discharge path that connects from the air supply port 102 to the casing 20 through the air supply pipe 23, and further reaches the exhaust port 103 through the exhaust duct 22, is formed in the outer casing 10. The premixing device 14, the combustion fan 13, the check valve 15, the burner 11, and the heat exchanger 12 are arranged in this order from an upstream side of the air supply-discharge path.

Further, a control circuit 100 is installed in the outer casing 10. The control circuit 100 controls operations of the whole combustion apparatus 1 such as turning on or off the burner 11, adjusting a rotation speed of a fan motor 130 as a rotary drive source of the combustion fan 13, and adjusting the opening degree of the mixing valve (not-shown) in the premixing device 14 (see FIG. 1).

Figure 2:
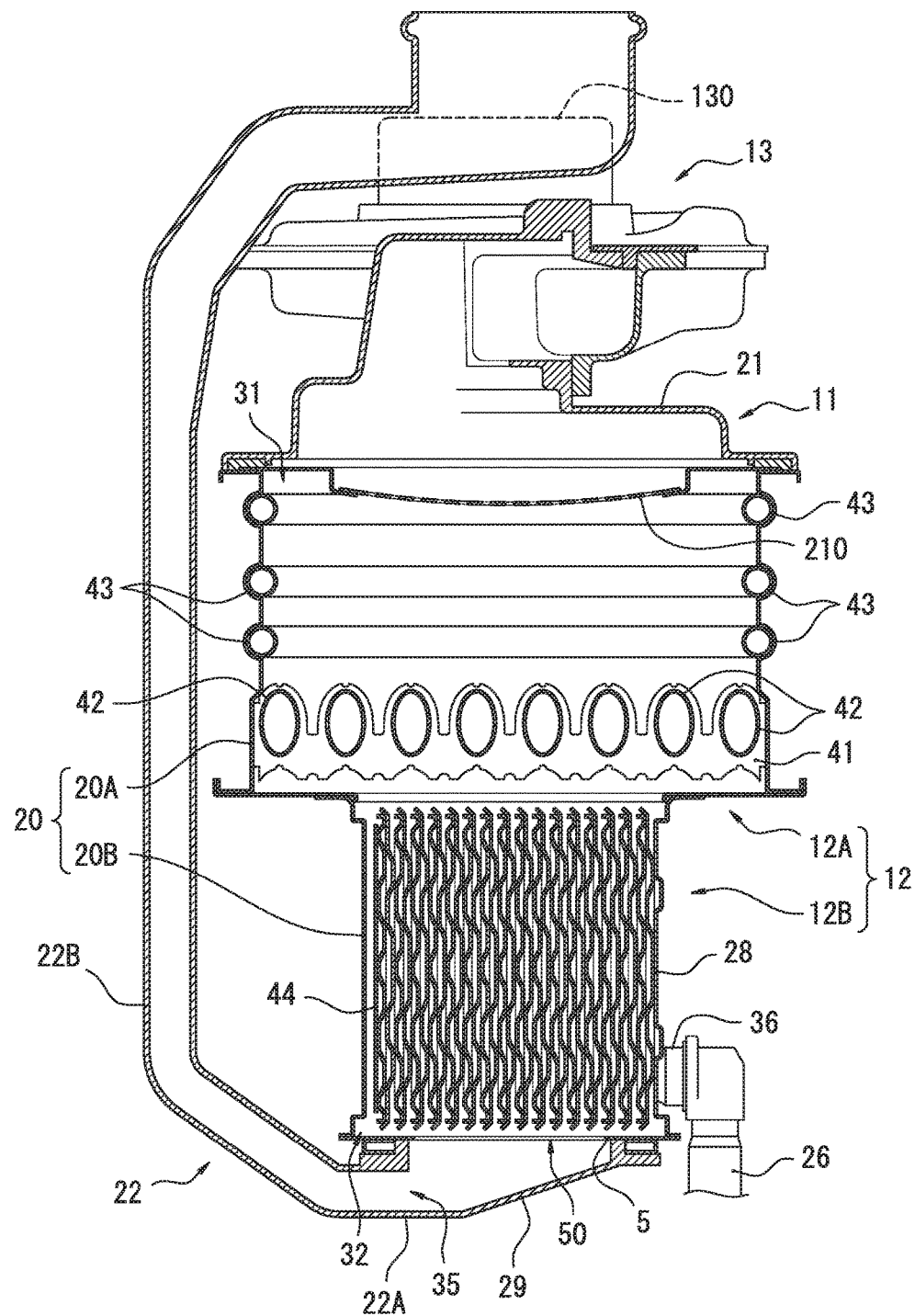
FIG. 2 is a schematic vertical section in side view showing the combustion apparatus according to the embodiment of the present invention.

As shown in FIGS. 1 and 2, at a bottom-side opening of the burner body 21, a combustion plate 210 having a plurality of flame ports is provided. The burner 11 ejects the mixture gas supplied into the burner body 21 downward from the flame ports of the combustion plate 210, by air supply pressure of the combustion fan 13. The combustion exhaust gas is generated by igniting the mixture gas. Accordingly, an combustion amount of the burner 11 is adjusted by changing the rotation speed of the fan motor 130.

The heat exchanger 12 includes a sensible heat exchange unit 12A for recovering sensible heat in the combustion exhaust gas supplied into the casing 20 and heating the water supplied from the water supply pipe L1, and a latent heat exchange unit 12B for recovering latent heat in the combustion exhaust gas supplied into the casing 20 and heating the water.

The casing 20 includes an upper can body 20A forming an exterior of the sensible heat exchange unit 12A, and a lower can body 20B forming an exterior of the latent heat exchange unit 12B. An upper end of the upper can body 20A is connected to the burner 11, a lower end of the upper can body 20A is connected to an upper end of the lower can body 20B, and a lower end of the lower can body 20B is connected to the exhaust duct 22. Accordingly, the combustion exhaust gas ejected from the burner 11 is introduced into the sensible heat exchange unit 12A from above. Then, the combustion exhaust gas passes through the sensible heat exchange unit 12A and the latent heat exchange unit 12B. Further, the combustion exhaust gas is discharged to the exhaust duct 22 provided beneath the latent heat exchange unit 12B. In this embodiment, the upper can body 20A has a wider width in the front-and-back direction than the lower can body 20B (see FIG. 2).

The sensible heat exchange unit 12A includes the upper can body 20A, a plurality of plate shaped heat transfer fins 41 provided upright and juxtaposed to each other at predetermined intervals in the upper can body 20A, a plurality of first heat-transfer tubes 42 penetrating through the heat transfer fins 41 and substantially horizontally extending between right and left side walls of the upper can body 20A, and a plurality of second heat-transfer tubes 43 substantially horizontally extending along front and rear side walls of the upper can body 20A. The first heat-transfer tube 42 and the second heat-transfer tube 43 have a substantially elliptic vertical cross-sectional shape and a substantially circular vertical cross-sectional shape, respectively.

The first heat-transfer tubes 42 and the second heat-transfer tubes 43 have their respective ends connected to each other in series. Thus, one sensible heat exchange tube path is formed in the upper can body 20A. An outlet-side tube end of the second heat-transfer tube 43 as a downstream end of the sensible heat exchange tube path is connected to a hot water outlet pipe 25 as a hot water discharge path to the hot-water supply pipe L2. An inlet-side tube end of the first heat-transfer tube 42 as an upstream end of the sensible heat exchange tube path is connected to a latent heat exchange tube path of the latent heat exchange unit 12B via a coupling pipe 27.

The latent heat exchange unit 12B includes the lower can body 20B, and a heat transfer unit 44. The heat transfer unit 44 has a plurality of plate bodies provided upright and overlaid on each other in the lower can body 20B, and hollow portions formed between the plate bodies and capable of passing the water. Therefore, one of the hollow portions forms one of the latent heat exchange tube path.

On one side surface of the heat transfer unit 44 (in this embodiment, a front wall 28 of the lower can body 20B), an inlet-side tube connection portion 36 as an upstream end of the latent heat exchange tube path and an outlet-side tube connection portion 37 as a downstream end of the latent heat exchange tube path are provided. The outlet-side tube connection portion 37 is connected to the coupling pipe 27 and the inlet-side tube connection portion 36 is connected to a water inlet pipe 26 as a water introduction path from the water supply pipe L1.

Accordingly, during a hot-water supply operation, the water introduced from the water supply pipe L1 into the water inlet pipe 26 flows through the heat transfer unit 44 of the latent heat exchange unit 12B to the coupling pipe 27. Then, the water further flows through the first heat-transfer tubes 42 and the second heat-transfer tubes 43 of the sensible heat exchange unit 12A. Further, the water is discharged from the hot water outlet pipe 25 to the hot-water supply pipe L2. In accordance with flow of the water, the sensible heat in the combustion exhaust gas supplied into the casing 20 is recovered by the heat transfer fins 41, the first heat-transfer tubes 42, and the second heat-transfer tubes 43, and the latent heat in the combustion exhaust gas is recovered by the heat transfer unit 44. Thus, the hot water at a desired temperature is supplied to the hot-water supplying terminal P.

As shown in FIG. 2, a bottom wall 29 of the bottom cover 22A is recessed, so that an upper surface of the bottom wall 29 is inclined downward from an outer circumference side toward a particular portion on an inner side. Thus, the bottom cover 22A collects drain that is generated by condensation of moisture in the combustion exhaust gas on surfaces of the heat transfer fins 41, outer surfaces of the first heat-transfer tubes 42 and the second heat-transfer tubes 43, and surfaces of the plate bodies of the heat transfer unit 44 as the heat exchanger 12 recovers the sensible heat or the latent heat in the combustion exhaust gas. The drain is gathered at the lowermost portion of the upper surface of the bottom wall 29. That is, the bottom cover 22A acts as a drain receiver.

The lowermost portion of the bottom wall 29 of the bottom cover 22A is connected to a drain neutralizer 16. The collected drain at the lowermost portion is fed to the drain neutralizer 16. Further, the drain is discharged to the outside of the combustion apparatus 1 after neutralized by a neutralizer filled in the drain neutralizer 16.

At the lower end 32 of the lower can body 20B positioned on the downstream side in the circulation path of the combustion exhaust gas inside the casing 20, an exhaust resistance member 5 having a plurality of ventilation ports 50 is provided. The substantially flat plate shaped exhaust resistance member 5 forms a bottom wall of the lower can body 20B. Accordingly, the drain generated by condensation of moisture in the combustion exhaust gas in the heat exchanger 12 drips onto the exhaust resistance member 5, thereafter flows onto the bottom cover 22A through the ventilation ports 50. Further, the combustion exhaust gas introduced into the lower can body 20B is sent into the bottom cover 22A through the ventilation ports 50, and discharged to the outside of the combustion apparatus 1 from the exhaust discharge port 35 through the cylinder body 22B. In this embodiment, the exhaust resistance member 5 is integrally formed with the lower can body 20B at lower ends of side walls, but the exhaust resistance member 5 may be individually formed with the lower can body 20B.

Figure 3:
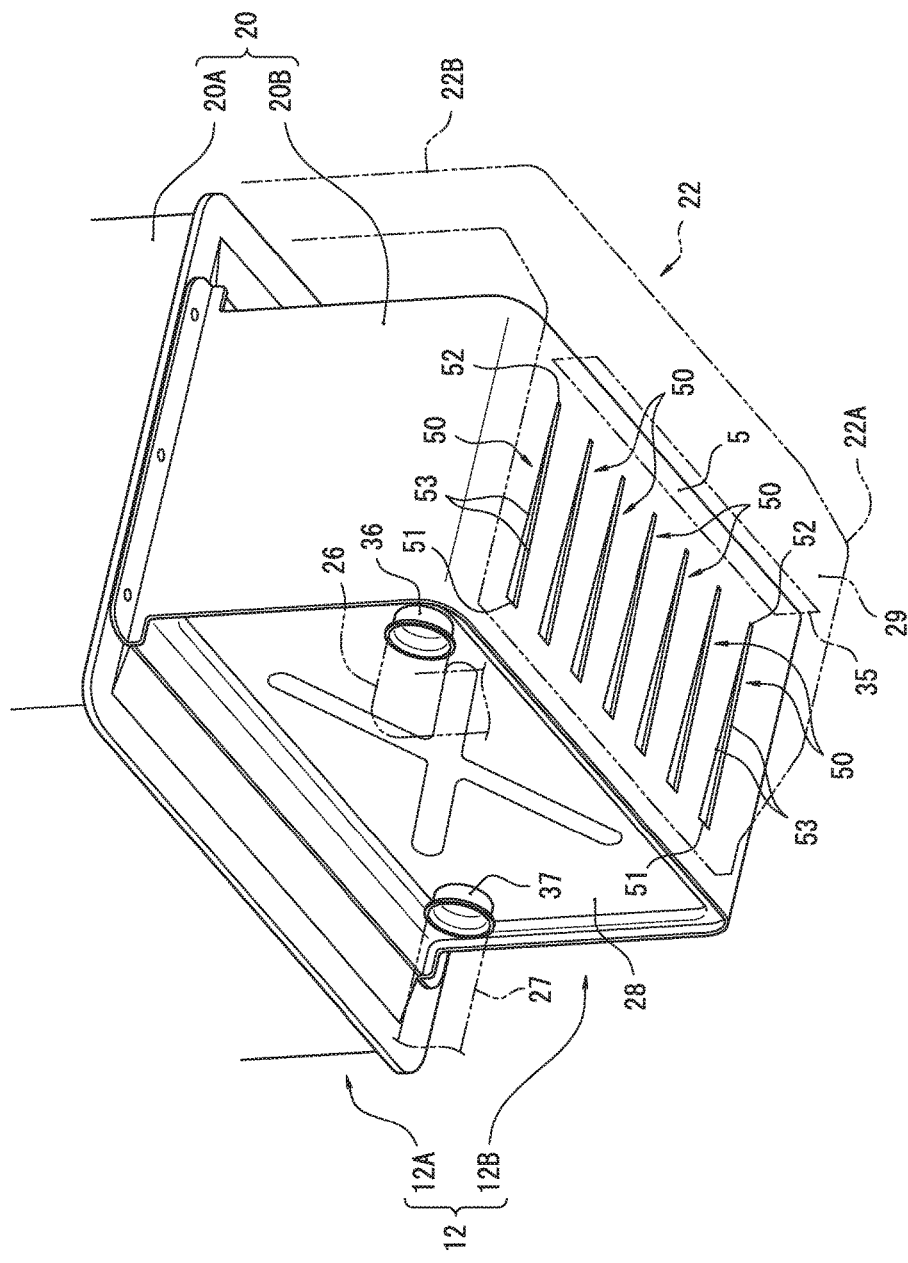
FIG. 3 is a schematic lower perspective view showing a lower portion of the casing of the combustion apparatus according to the embodiment of the present invention.

As shown in FIG. 3, each of the ventilation ports 50 has an elongated hole shape extending in the front-and-back direction of the exhaust resistance member 5, i.e., the direction in which the combustion exhaust gas flows from beneath the casing 20 to the cylinder body 22B of the exhaust duct 22. A plurality of (in this embodiment, seven) ventilation ports 50 are laterally juxtaposed to each other at equal intervals. More precisely, each of the ventilation ports 50 has a substantially elongated trapezoidal hole shape as seen in a plan view, so that an opening width continuously becomes wider from a rear end (one end on an exhaust discharge port 35 side) 52 toward a front end (other end on a front wall 28 side of the casing 20) 51. Accordingly, airflow resistance of the combustion exhaust gas flowing from the casing 20 to the exhaust duct 22 via the ventilation ports 50 of the exhaust resistance member 5 becomes smaller as a distance from the exhaust discharge port 35 increases.

Although not shown, at long edges 53 of each of the ventilation ports 50, rib plates, which extend from a front end side to a back end side and protrude downward, are respectively provided by burring or hemming. Each of the rib plates has a predetermined projecting length (for example, 0.6 mm from a lower surface of the exhaust resistance member 5). Thus, the long edges 53 of each of the ventilation ports 50 are formed with a circular-arc shaped surface curved downward from an upper surface of the exhaust resistance member 5 at a corner.

According to the combustion apparatus 1, each of the ventilation ports 50 of the exhaust resistance member 5 has the elongated hole shape extending in the front-and-back direction (the direction in which the combustion exhaust gas flows). Therefore, when the drain dripped onto the exhaust resistance member 5 reaches a circumferential edge of one of the ventilation ports 50, the drain easily spreads along a long edge 53 of the ventilation port 50. Thus, a film of water is less prone to be formed on the ventilation port 50. Accordingly, a reduction in input of the burner 11 due to closing of the ventilation ports 50 by the drain can be prevented, and a hot water supply performance can be stabilized.

Moreover, according to the combustion apparatus 1, since the exhaust resistance member 5 having the ventilation ports 50 is provided at the lower end 32 of the casing 20, the exhaust resistance member 5 regulates an exhaust flow rate from the casing 20 to the exhaust duct 22 to be constant. Such regulation increases the time during which the combustion exhaust gas is in contact with the heat transfer unit 44 of the latent heat exchange unit 12B. With this configuration, the heat transfer unit 44 can efficiently recover the latent heat in the combustion exhaust gas. Accordingly, the hot water supply performance can be further stabilized.

Further, as described above, the exhaust resistance member 5 properly regulates the exhaust flow rate. Thus, even when the fan motor 130 is rotated at a predetermined high rotation speed and the burner 11 is combusted intensively, the stable combustion balance is attained, and vibration combustion is less prone to occur. Hence, combustion noise can be also reduced.

Further, according to the combustion apparatus 1, the opening width of each of the ventilation ports 50 is widened from the exhaust discharge port 35 side (the cylinder body 22B side) toward an opposite side. Therefore, the drain reaching the circumferential edge of each of the ventilation ports 50 easily spreads along the long edge 53 toward a wider-width front end 51 side where surface tension of the film of water is low. Thus, the film of water is less prone to be formed on the ventilation ports 50. Accordingly, the reduction in input of the burner 11 due to the closing of the ventilation ports 50 by the drain can be further prevented, and the hot water supply performance can be further stabilized.

Further, since the front end 51 of each of the ventilation ports 50 is wider than the rear end 52 on the exhaust discharge port 35 side (the cylinder body 22B side), the combustion exhaust gas is efficiently guided not only to a region closed to the exhaust discharge port 35 side but also to an opposite region farther from the exhaust discharge port 35 side (the cylinder body 22B side). Thus, a difference in an exhaust flow speed between the cylinder body 22B side and the opposite side is less prone to occur, and the combustion balance of the burner 11 is more stabilized. Accordingly, the combustion noise can be further reduced. Moreover, since the heat exchanger 12 more efficiently recovers the sensible and latent heat in the combustion exhaust gas, the hot water supply performance can be further stabilized.

Furthermore, according to the combustion apparatus 1, the circular-arc shaped surface curved downward from the upper surface of the exhaust resistance member 5 is formed at the long edge 53 of each of the ventilation ports 50. Thus, when the drain reaches the long edge 53, the drain smoothly flows downward from the upper surface of the exhaust resistance member 5 to the rib plate along the circular-arc shaped surface. Accordingly, the drain is not likely to be retained at the circumferential edge of each of the ventilation ports 50, and the reduction in input of the burner 11 due to the closing of the ventilation ports 50 by the drain can be further prevented, whereby the hot water supply performance can be further stabilized.

The total opening area of the ventilation ports 50 to the area of the entire exhaust resistance member 5 is, for example, about 15%. When the combustion apparatus 1 containing the exhaust resistance member 5 including the ventilation ports 50 having the total opening area of such a value and a comparative combustion apparatus not containing the exhaust resistance member 5 were compared against each other as to thermal efficiency in a hot-water supply operation mode, the combustion apparatus 1 showed the thermal efficiency about 1.5% higher than the thermal efficiency of the comparative combustion apparatus.

In the embodiment described above, each of the ventilation ports 50 has the substantially elongated trapezoidal hole shape so that the opening width becomes wider from the exhaust discharge port 35 side toward the opposite side, but the ventilation ports 50 may have other shapes that the film of water is hardly formed. For example, the ventilation port 50 may have a substantially elongated rectangular hole shape that both the front and rear ends 51, 52 have same widths, an elongated hole shape that both the front and rear ends 51, 52 respectively have an arced shape, or an elongated elliptic hole shape. Further, the ventilation ports 50 may be divided into a plurality of regions in the front-and-back direction.

Figure 4:
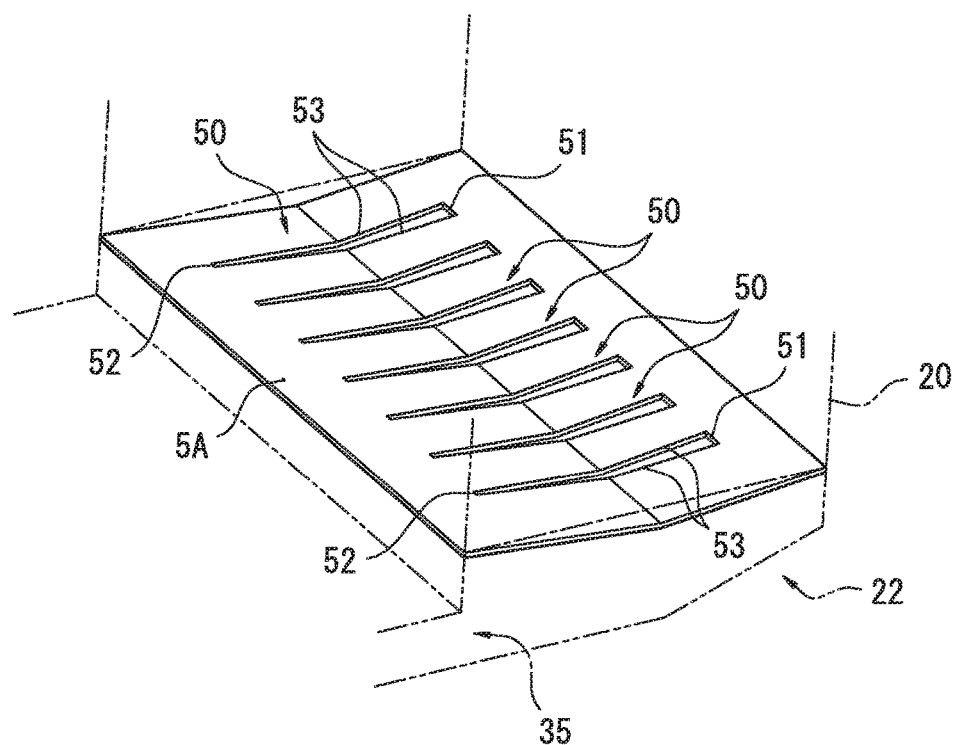
FIG. 4 is a schematic diagram showing other example A of an exhaust resistance member of the combustion apparatus according to the embodiment of the present invention.

Moreover, as shown in FIG. 4, an exhaust resistance member 5A may be formed with a curved plate in which part of ventilation ports 50 in an extending direction (the front-and-back direction) is recessed downward. For example, the curved plate may have a substantially V-shaped vertical cross section or a substantially arc-shaped vertical cross section. In the case where the exhaust resistance member 5A is used, drain dripped onto the exhaust resistance member 5A is gathered at a recess, and positively discharged beneath the exhaust resistance member 5A through the ventilation ports 50. As a result, the drain is not likely to be retained at a circumferential edge of each of the ventilation ports 50. Thus, a film of water is less prone to be formed on the ventilation ports 50. Accordingly, a reduction in input of the burner 11 due to closing of the ventilation ports 50 by the drain can be further prevented, and a hot water supply performance can be further stabilized.

Figure 5:
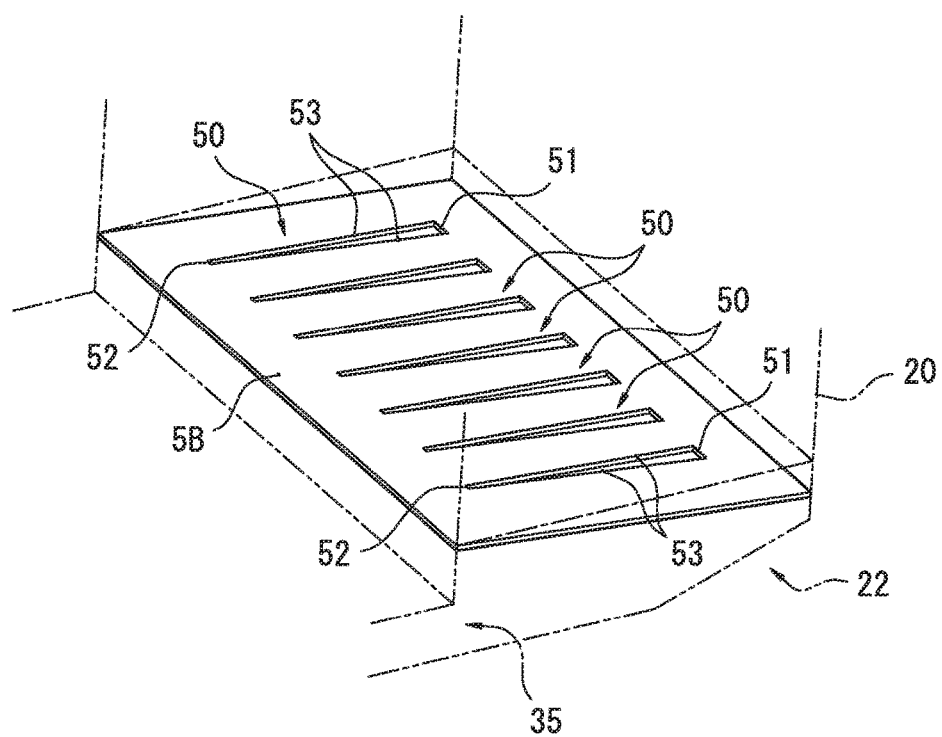
FIG. 5 is a schematic diagram showing other example B of an exhaust resistance member of the combustion apparatus according to the embodiment of the present invention.

As shown in FIG. 5, an exhaust resistance member 5B may be provided so as to incline downward from a rear end 52 side of a ventilation port 50 toward a front end 51 side of the ventilation port 50. In the case where the exhaust resistance member 5B is used, drain dripped onto the exhaust resistance member 5B flows along an inclined surface of the exhaust resistance member 5B from a rear end 52 side toward a front end 51 side. Thus, the drain is not likely to be retained at a circumferential edge of each of the ventilation ports 50. Accordingly, a reduction in input of the burner 11 due to closing of the ventilation ports 50 by the drain can be further prevented, and a hot water supply performance can be further stabilized.

Figure 6:
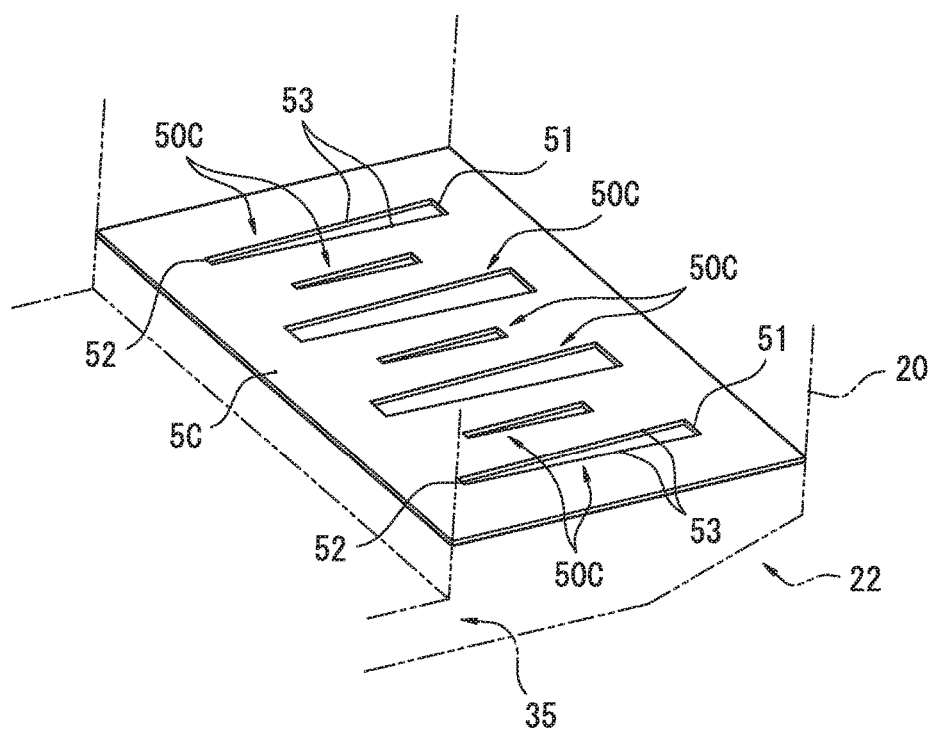
FIG. 6 is a schematic diagram showing other example C of an exhaust resistance member of the combustion apparatus according to the embodiment of the present invention.

Further, as shown in FIG. 6, an exhaust resistance member 5C may have a plurality of ventilation ports 50 having different sizes in accordance with a characteristic such as an exhaust flow rate or an exhaust flow speed of combustion exhaust gas passing through different regions of the exhaust resistance member 5C. In the case where the exhaust resistance member 5C is used, the exhaust flow rate from a casing 20 to an exhaust duct 22 is regulated more properly. Accordingly, even when the burner 11 is combusted intensively, combustion balance is more stabilized, and combustion noise can be further reduced. Furthermore, the ventilation ports 50 are formed so that an opening width continuously becomes wider as a distance from an exhaust discharge port 35 increases, but the ventilation port 50 may be formed so that the opening width becomes wider in stages.

Figure 7:
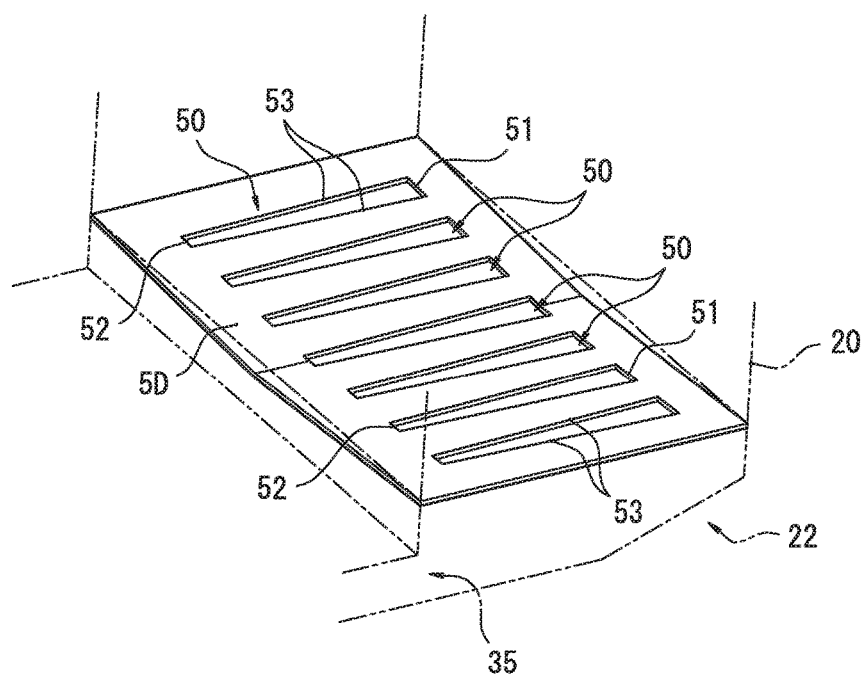
FIG. 7 is a schematic diagram showing other example D of an exhaust resistance member of the combustion apparatus according to the embodiment of the present invention.

As shown in FIG. 7, an exhaust resistance member 5D may be formed with a curved plate inclined downward from right and left ends toward a central portion. Specifically, the central portion in a direction (the left-and-right direction) crossing an extending direction of the ventilation ports 50 is recessed downward. For example, the curved plate may have a substantially V-shaped vertical cross section or a substantially arc-shaped vertical cross section. In the case where the exhaust resistance member 5D is used, drain dripped onto the exhaust resistance member 5D is gathered at a recess, and positively discharged beneath the exhaust resistance member 5D through the ventilation ports 50. As a result, the drain is not likely to be retained at a circumferential edge of each of the ventilation ports 50. Accordingly, a reduction in input of the burner 11 due to closing of the ventilation ports 50 by the drain can be further prevented, and a hot water supply performance can be further stabilized.

The present invention can be applied to a combustion apparatus without the check valve 15 at the gas introduction port 33 of the burner body 21. Further, the present invention is not limited to a combustion apparatus only having a hot-water supply function. The present invention can be applied to a combustion apparatus having a bathwater reheating function. Moreover, the present invention can be applied to a heat source device for a room heater supplying hot water to a hot water heating terminal, a heat source device of a storage type water heater, or a water heater only having a sensible heat exchanger.

As described in detail, the present invention is summarized as follows.

According to one aspect of the present invention, there is provided a combustion apparatus comprising:

a burner for combusting fuel gas to generate combustion exhaust gas;

a heat exchanger for recovering heat in the combustion exhaust gas to heat a heat medium, the heat exchanger being accommodated in a casing having a substantially quadrangular box shape;

an exhaust passage for discharging the combustion exhaust gas from an exhaust port, the exhaust passage being provided to one side surface side of the casing; and an exhaust resistance member having a plurality of ventilation ports through which the combustion exhaust gas passes and being provided beneath the heat exchanger, wherein the burner, the heat exchanger, and the exhaust passage are arranged in such a manner that the combustion exhaust gas flows from top to bottom through the heat exchanger in the casing, and further from beneath the casing to the exhaust port via the exhaust passage provided at the one side surface side of the casing, and at least one part of the ventilation ports of the exhaust resistance member has an elongated hole shape extending in the flow direction of the combustion exhaust gas from beneath the casing to the exhaust passage.

According to the combustion apparatus described above, when drain dripped onto the exhaust resistance member reaches a circumferential edge of each of the ventilation ports, the drain easily spreads along a long edge of the ventilation port. Thus, a film of water is less prone to be formed on the ventilation port. Accordingly, a reduction in input of the burner due to closing of the ventilation ports by the drain can be prevented. Further, since the exhaust resistance member having the ventilation ports is provided between the casing and the exhaust passage, the exhaust resistance member can properly regulate an exhaust flow rate of the combustion exhaust gas discharged from the casing.

Preferably, in the combustion apparatus described above, one end of the ventilation port farther from the exhaust passage has a wider width than other end of the ventilation port closed to the exhaust passage.

According to the combustion apparatus described above, since an opening width of the ventilation port is widened from an exhaust passage side toward an opposite side, the drain reaching the circumferential edge of the ventilation port easily spreads along the long edge toward a wider-width one end side. Thus, the film of water is less prone to be formed on the ventilation port. Accordingly the reduction in input of the burner due to the closing of the ventilation ports by the drain can be further prevented.

Further, when the exhaust passage is provided to the one side surface side of the casing, the combustion exhaust gas is easily guided to a region of the exhaust resistance member closed to the exhaust passage. However, according to the combustion apparatus described above, since the ventilation port having the elongated hole shape is formed so that one end of the ventilation port farther from the exhaust passage has a wider width than other end of the ventilation port closed to the exhaust passage, the combustion exhaust gas is efficiently guided to a region farther from the exhaust passage. Thus, a difference in the exhaust flow speed between the exhaust passage side and an opposite side thereof is less prone to occur, and the combustion balance is more stabilized.

Preferably, in the combustion apparatus described above, the exhaust resistance member has a downwardly recessed shape or a inclined shape so that any one of ends of the ventilation port is positioned downward.

When the exhaust resistance member has the downwardly recessed shape, the drain dipped onto the exhaust resistance member from the heat exchanger is gathered at the recess, and positively discharged beneath the exhaust resistance member through the ventilation ports. When the exhaust resistance member has the inclined shape so that any one of ends in an extending direction (i.e., a longitudinal direction) of the ventilation port is positioned downward, the drain dripped onto the exhaust resistance member from the heat exchanger flows toward the one end of the ventilation port at a lower position. Thus, according to the combustion apparatus described above, the drain is not likely to be retained at the circumferential edge of the ventilation port. Accordingly, the reduction in input of the burner due to the closing of the ventilation ports by the drain can be further prevented.

Preferably, in the combustion apparatus described above, at least one part of the ventilation ports has a different size from at least one other part of the ventilation ports.

According to the combustion apparatus described above, the size of each of the ventilation ports can be determined in accordance with a characteristic such as the exhaust flow rate, the exhaust flow speed, or pressure of the combustion exhaust gas passing through different regions of the exhaust resistance member. Accordingly, the exhaust flow rate from the casing is regulated more properly.

Preferably, in the combustion apparatus described above, a long edge of the ventilation port has a circular-arc shaped surface curved downward from an upper surface of the exhaust resistance member.

According to the combustion apparatus described above, when the drain reaches the long edge, the drain smoothly flows downward from the upper surface of the exhaust resistance member along the circular-arc shaped surface. Accordingly, the drain is not likely to be retained at the circumferential edge of each of the ventilation ports, and the reduction in input of the burner 11 due to the closing of the ventilation ports by the drain can be further prevented.

Although the present invention has been described in detail, the foregoing descriptions are merely exemplary at all aspects, and do not limit the present invention thereto. It should be understood that an enormous number of unillustrated modifications may be assumed without departing from the scope of the present invention.

What is claimed is:
1. A combustion apparatus comprising:
a burner for combusting fuel gas to generate combustion exhaust gas;
a heat exchanger for recovering heat in the combustion exhaust gas to heat a heat medium, the heat exchanger being accommodated in a casing having a substantially quadrangular box shape;
an exhaust passage for discharging the combustion exhaust gas from an exhaust port, the exhaust passage being provided to one side surface side of the casing; and an exhaust resistance member having a plurality of ventilation ports through which the combustion exhaust gas passes and being provided beneath the heat exchanger, wherein the burner, the heat exchanger, and the exhaust passage are arranged in such a manner that the combustion exhaust gas flows from top to bottom through the heat exchanger in the casing, and further from beneath the casing to the exhaust port via the exhaust passage provided at the one side surface side of the casing, and at least one part of the ventilation ports of the exhaust resistance member has an elongated hole shape extending in the flow direction of the combustion exhaust gas from beneath the casing to the exhaust passage.

2. The combustion apparatus according to claim 1, wherein
one end of the ventilation port farther from the exhaust passage has a wider width than other end of the ventilation port closed to the exhaust passage.

3. The combustion apparatus according to claim 1, wherein
the exhaust resistance member has a downwardly recessed shape or a inclined shape so that any one of ends of the ventilation port is positioned downward.

4. The combustion apparatus according to claim 1, wherein
at least one part of the ventilation ports has a different size from at least one other part of the ventilation ports.

5. The combustion apparatus according to claim 1, wherein
a long edge of the ventilation port has a circular-arc shaped surface curved downward from an upper surface of the exhaust resistance member.

* * * * *